United States Patent
Amici et al.

(10) Patent No.: US 9,034,477 B2
(45) Date of Patent: May 19, 2015

(54) COATING COMPOSITION, A FILM CONTAINING THE SAME, AND A METHOD FOR FORMING A SEALABLE FILM

(71) Applicant: Dow Global Technologies LLC, Midland, MI (US)

(72) Inventors: Marco Amici, Waedenswil (CH); Thomas Udhayasingh, Huenenberg (CH); Jozef Van Dun, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 46 days.

(21) Appl. No.: 13/784,881

(22) Filed: Mar. 5, 2013

(65) Prior Publication Data

US 2014/0255683 A1  Sep. 11, 2014

(51) Int. Cl.
| | | |
|---|---|---|
| *B32B 27/00* | (2006.01) | |
| *B05D 3/12* | (2006.01) | |
| *C04B 24/22* | (2006.01) | |
| *C09D 123/16* | (2006.01) | |
| *C09D 123/08* | (2006.01) | |
| *C09D 123/14* | (2006.01) | |
| *C09J 123/08* | (2006.01) | |
| *C08L 23/08* | (2006.01) | |

(52) U.S. Cl.
CPC ............ *C09D 123/16* (2013.01); *C09D 123/08* (2013.01); *C09D 123/142* (2013.01); *C09D 123/0869* (2013.01); *C09J 123/0853* (2013.01); *C08L 23/0853* (2013.01); *C08L 23/0869* (2013.01); *C08L 2205/02* (2013.01)

(58) Field of Classification Search
None
See application file for complete search history.

(56) References Cited

U.S. PATENT DOCUMENTS

| | | |
|---|---|---|
| 3,645,992 A | 2/1972 | Elston |
| 4,076,698 A | 2/1978 | Anderson et al. |
| 4,599,392 A | 7/1986 | McKinney et al. |
| 4,988,781 A | 1/1991 | McKinney et al. |
| 5,272,236 A | 12/1993 | Lai et al. |
| 5,278,272 A | 1/1994 | Lai et al. |
| 5,504,172 A | 4/1996 | Imuto et al. |
| 5,938,437 A | 8/1999 | DeVincenzo |
| 7,947,776 B2 | 5/2011 | Moncla et al. |
| 8,202,623 B2 | 6/2012 | Dabadie et al. |
| 2006/0199930 A1 | 9/2006 | Li Pi Shan et al. |
| 2008/0057878 A1 | 3/2008 | Staszewski et al. |
| 2009/0194450 A1 | 8/2009 | Dabadie et al. |
| 2010/0248119 A1* | 9/2010 | Young et al. ............... 430/108.2 |

FOREIGN PATENT DOCUMENTS

| | | |
|---|---|---|
| WO | WO 2005/090427 | 9/2005 |
| WO | WO 2005085331 | 9/2005 |

OTHER PUBLICATIONS

U.S. Appl. No. 60/988,999, filed Nov. 19, 2007, Hughes et al.

* cited by examiner

*Primary Examiner* — Sheeba Ahmed

(57) ABSTRACT

A coating composition comprising: an aqueous dispersion comprising: the melt-kneading product of (A) a base polymer which comprises one or more thermoplastic polymers, (B) a stabilizing agent which comprises at least one component selected from the group consisting of acrylic acid grafted ethylene-based polymers and maleic anhydride grafted polyolefins; (C) a neutralizing agent; and (D) water; wherein the aqueous dispersion has a volume average particle size of less than about 5 μm is provided.

19 Claims, No Drawings

COATING COMPOSITION, A FILM CONTAINING THE SAME, AND A METHOD FOR FORMING A SEALABLE FILM

FIELD OF INVENTION

The instant invention relates to a coating composition, a film containing the same, and a method for forming a sealable film.

BACKGROUND OF THE INVENTION

Heat sealed biaxially oriented films, and particularly biaxially oriented polypropylene (BOPP) films, are used as a preferred material for packaging various products. BOPP is a preferred material for packaging confectionary products due to its high gloss, good mechanics and very low shrinkage. In such applications, the biaxially oriented films may be heat sealed. Ultra-fast packaging lines for confectionary products operate at more than 1500 pieces wrapped per minute. Such lines require ultra-low temperature sealing of the BOPP or other film to minimize packaging time. While BOPP films coextruded with sealing layers are known, such sealants require temperatures of at least about 70° C. to form a seal.

SUMMARY OF THE INVENTION

The instant invention is a coating composition and a film containing the coating composition and a method for forming a sealable film.

In one embodiment, the instant invention provides a coating composition comprising an aqueous dispersion which comprises the melt-kneading product of (A) from 60 to 95 wt % of a base polymer which comprises one or more thermoplastic polymers; (B) from 5 to 40 wt %, based upon the total weight of (A) and (B), of a stabilizing agent which comprises at least one component selected from the group consisting of ethylene-acrylic acid copolymers, ethylene-methacrylic acid copolymer, maleic anhydride grafted polyolefins, and combinations thereof; (C) a neutralizing agent; and (D) water; wherein the aqueous dispersion has a volume average particle size of less than about 5 µm; wherein a biaxially oriented polypropylene film having a coating layer derived from the application of the aqueous dispersion at a rate of from 1 to 2 grams per square meter has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer.

DETAILED DESCRIPTION

The instant invention is a coating composition, a film containing the same, and a method for forming a film.

As used herein, the term "ethylene-based polymer" refers to a polymer having more than 50 mole percent units derived from ethylene monomer (based on the total amount of polymerizable monomers), and, optionally, one or more comonomers.

As used herein, the term "propylene-based polymer" refers to a polymer having more than 50 mole percent units derived from propylene monomer (based on the total amount of polymerizable monomers), and, optionally, one or more comonomers.

As used herein, the term "homopolymer" is a polymer that is formed from only a single type of monomer, such as ethylene.

As used herein, the term "interpolymer" refers to polymers prepared by the copolymerization of at least two different types of monomers. The term interpolymer includes copolymers, usually employed to refer to polymers prepared from two different monomers, and polymers prepared from more than two different types of monomers, such as terpolymers.

The coating composition according to the present invention comprises an aqueous dispersion which comprises the melt-kneading product of (A) from 60 to 95 wt % of a base polymer which comprises one or more thermoplastic polymers; (B) from 5 to 40 wt %, based upon the total weight of (A) and (B), of a stabilizing agent which comprises at least one component selected from the group consisting of ethylene-acrylic acid copolymers, ethylene-methacrylic acid copolymer, maleic anhydride grafted polyolefins, and combinations thereof; (C) a neutralizing agent; and (D) water; wherein the aqueous dispersion has a volume average particle size of less than about 5 µm; wherein a biaxially oriented polypropylene film having a coating layer derived from the application of the aqueous dispersion at a rate of from 1 to 2 grams per square meter (gsm) has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer.

In an alternative embodiment, the instant invention further provides a film comprising a first layer which comprises one or more biaxially oriented polyolefins; and at least one coating layer applied to the first layer and derived from a coating composition which comprises an aqueous dispersion comprising the melt-kneading product of (A) a base polymer which comprises one or more thermoplastic polymers; (B) from 5 to 40 wt %, based on the total weight of (A) and (B), of a stabilizing agent which comprises at least one component selected from the group consisting of ethylene-acrylic acid copolymers, ethylene-methacrylic acid copolymers, maleic anhydride grafted polyolefins, and combinations of two or more thereof; (C) a neutralizing agent; and (D) water; wherein the aqueous dispersion has a volume average particle size of less than about 5 µm; and wherein a biaxially oriented polypropylene film having a coating layer derived from the application of the coating composition at a rate of from 1 to 2 grams per square meter has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer.

In another alternative embodiment, the instant invention further provides a method for forming a sealable film comprising selecting a substrate formed from one or more biaxially oriented polyolefins; selecting a coating composition which comprises an aqueous dispersion derived from the melt kneading of (A) a base polymer which comprises one or more thermoplastic polymers; (B) from 5 to 40 wt %, based on the total weight of (A) and (B), of a stabilizing agent which comprises at least one component selected from the group consisting of ethic acid copolymers, maleic anhydride grafted polyolefins, and combinations thereof; (C) a neutralizing agent; and (D) water; wherein the aqueous dispersion has a volume average particle size of less than about 5 µm; applying the coating composition to at least one surface of the substrate; removing at least a portion of the water thereby forming a coating layer on the substrate and thereby forming a coated substrate.

In an alternative embodiment, the instant invention provides a coating composition, a film, and a method for forming a sealable film in accordance with any of the embodiments disclosed herein, except that a biaxially oriented polypropylene film having a coating layer derived from the application of the coating composition at a rate of from 1 to 2 grams per square meter has a heat seal strength of greater than or equal to 2 N/15 mm at a sealing temperature from 60 to 70° C. All individual values and subranges from equal to or greater than 2 N/15 mm at a sealing temperature from 60 to 70° C. are included herein and disclosed herein. For example, the seal strength at a sealing temperature from 60 to 70° C. may be equal to or greater than 2 N/15 mm, or in the alternative, the seal strength at a sealing temperature from 60 to 70° C. may be equal to or greater than 2.2 N/15 mm, or in the alternative, the seal strength at a sealing temperature from 60 to 70° C. may be equal to or greater than 2.3 N/15 mm, or in the alternative, the seal strength at a sealing temperature from 60 to 70° C. may be equal to or greater than 2.5 N/15 mm, or in the alternative, the seal strength at a sealing temperature from 60 to 70° C. may be equal to or greater than 2.7 N/15 mm.

In an alternative embodiment, the instant invention provides a coating composition, a film comprising a layer derived from the application of the coating composition, and a method for forming a coated substrate in accordance with any of the embodiments disclosed herein, except that the neutralizing agent is dimethylethanolamine.

In an alternative embodiment, the instant invention provides a coating composition, a film comprising a layer derived from the application of the coating composition, and a method for forming a coated substrate in accordance with any of the embodiments disclosed herein, except that the first layer and/or substrate is not primed prior to application of the coating layer onto the first layer.

In an alternative embodiment, the instant invention provides a coating composition, a film comprising a layer derived from the application of the coating composition, and a method for forming a coated substrate in accordance with any of the embodiments disclosed herein, except that the coating layer exhibits a sealing window from 60° C. to 140° C. All individual values and subranges from 60° C. to 140° C. are included herein and disclosed herein. For example, the sealing window may be from a lower limit of 60, 62, 64, 66, 75, 80, 90, or 100° C. to an upper limit of 80, 90, 100, 110, 120, 130 or 140° C. The sealing window may be from 60° C. to 140° C., or in the alternative, the sealing window may be from 64° C. to 140° C., or in the alternative, the sealing window may be from 60° C. to 80° C., or in the alternative, the sealing window may be from 66° C. to 100° C., or in the alternative, the sealing window may be from 70° C. to 140° C.

In an alternative embodiment, the instant invention provides a coating composition, a film comprising a layer derived from the application of the coating composition, and a method for forming a coated substrate in accordance with any of the embodiments disclosed herein, except that the application of the coating composition onto the first layer and/or substrate exhibits no build-up on coating rolls in regular machine processing.

In an alternative embodiment, the instant invention provides a coating composition, a film comprising a layer derived from the application of the coating composition, and a method for forming a coated substrate in accordance with any of the embodiments disclosed herein, except that the film is suitable for use in contact with food. As used herein, "suitable for use in contact with food" means compliant with current food contact EU regulation 10/2011.

In an alternative embodiment, the instant invention provides a coating composition, a film comprising a layer derived from the application of the coating composition, and a method for forming a coated substrate in accordance with any of the embodiments disclosed herein, except that the coating layer has a dry thickness of from 0.5 to 20 microns. All individual values and subranges from 0.5 to 20 microns are included herein and disclosed herein; for example, the coating layer dry thickness may be from a lower limit of 0.5, 2, 4, 6, 8, 10, 12, 14, 16, or 18 microns to an upper limit of 1, 3, 5, 7, 9, 11, 13, 15, 17, 19 or 20 microns. For example, the dry coating layer thickness can be from 0.5 to 20 microns, or in the alternative, the dry coating layer thickness can be from 0.5 to 10 microns, or in the alternative, the dry coating layer thickness can be from 10 to 20 microns, or in the alternative, the dry coating layer thickness can be from 0.5 to 5 microns.

In an alternative embodiment, the instant invention provides a coating composition, a film comprising a layer derived from the application of the coating composition, and a method for forming a coated substrate in accordance with any of the embodiments disclosed herein, except that the applying the aqueous dispersion is accomplished by hand coating or machine coating.

In an alternative embodiment, the instant invention provides a coating composition, a film comprising a layer derived from the application of the coating composition, and a method for forming a coated substrate in accordance with any of the embodiments disclosed herein, except that the dry weight of the coating layer is equal to or less than 5 g/m$^2$. All individual values and subranges equal to or less than 5 g/m$^2$ are included herein and disclosed herein; for example, the weight of the coating layer may be equal to or less than 5 g/m$^2$, or in the alternative, the weight of the coating layer may be equal to or less than 4 g/m$^2$, or in the alternative, the weight of the coating layer may be equal to or less than 3 g/m$^2$, or in the alternative, the weight of the coating layer may be equal to or less than 2 g/m$^2$. In a specific embodiment, the weight of the coating layer is at least 0.01 g/m$^2$.

In an alternative embodiment, the coating composition consists essentially of an aqueous dispersion which comprises the melt-kneading product of (A) from 60 to 95 wt % of a base polymer which comprises one or more thermoplastic polymers; (B) from 5 to 40 wt %, based upon the total weight of (A) and (B), of a stabilizing agent which comprises at least one component selected from the group consisting of ethylene-acrylic acid copolymers, ethylene-methacrylic acid copolymer, maleic anhydride grafted polyolefins, and combinations thereof; (C) a neutralizing agent; and (D) water; wherein the aqueous dispersion has a volume average particle size of less than about 5 μm; wherein a biaxially oriented polypropylene film having a coating layer derived from the application of the aqueous dispersion at a rate of from 1 to 2 grams per square meter (gsm) has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer.

In an alternative embodiment, the coating composition comprises an aqueous dispersion which consists essentially of the melt-kneading product of (A) from 60 to 95 wt % of a base polymer which comprises one or more thermoplastic polymers; (B) from 5 to 40 wt %, based upon the total weight of (A) and (B), of a stabilizing agent which comprises at least one component selected from the group consisting of ethylene-acrylic acid copolymers, ethylene-methacrylic acid copolymer, maleic anhydride grafted polyolefins, and combinations thereof; (C) a neutralizing agent; and (D) water; wherein the aqueous dispersion has a volume average particle size of less than about 5 μm; wherein a biaxially oriented polypropylene film having a coating layer derived from the application of the aqueous dispersion at a rate of from 1 to 2 grams per square meter (gsm) has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer.

In an alternative embodiment, the coating composition comprises an aqueous dispersion which comprises the melt-kneading product of (A) from 60 to 95 wt % of a base polymer which consists essentially of one or more thermoplastic polymers; (B) from 5 to 40 wt %, based upon the total weight of (A) and (B), of a stabilizing agent which consists essentially of at least one component selected from the group consisting of ethylene-acrylic acid copolymers, ethylene-methacrylic acid copolymer, maleic anhydride grafted polyolefins, and combinations thereof; (C) a neutralizing agent; and (D) water; wherein the aqueous dispersion has a volume average particle size of less than about 5 μm; wherein a biaxially oriented polypropylene film having a coating layer derived from the application of the aqueous dispersion at a rate of from 1 to 2 grams per square meter (gsm) has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer.

In an alternative embodiment, the instant invention further provides a film comprising a first layer which consists essentially of one or more biaxially oriented polyolefins; and at least one coating layer applied to the first layer and derived from a coating composition which consists essentially of an aqueous dispersion comprising the melt-kneading product of (A) a base polymer which comprises one or more thermoplastic polymers; (B) from 5 to 40 wt %, based on the total weight of (A) and (B), of a stabilizing agent which comprises at least one component selected from the group consisting of ethylene-acrylic acid copolymers, ethylene-methacrylic acid copolymers, maleic anhydride grafted polyolefins, and combinations of two or more thereof; (C) a neutralizing agent; and (D) water; wherein the aqueous dispersion has a volume average particle size of less than about 5 μm; and In an alternative embodiment, the instant invention further provides a film comprising a first layer which comprises one or more biaxially oriented polyolefins; and at least one coating layer applied to the first layer and derived from a coating composition which consists essentially of an aqueous dispersion comprising the melt-kneading product of (A) a base polymer which comprises one or more thermoplastic polymers; (B) from 5 to 40 wt %, based on the total weight of (A) and (B), of a stabilizing agent which comprises at least one component selected from the group consisting of ethylene-acrylic acid copolymers, ethylene-methacrylic acid copolymers, maleic anhydride grafted polyolefins, and combinations of two or more thereof; (C) a neutralizing agent; and (D) water; wherein the aqueous dispersion has a volume average particle size of less than about 5 μm; and In another alternative embodiment, the instant invention further provides a method for forming a sealable film consisting essentially of selecting a substrate formed from one or more biaxially oriented polyolefins; selecting a coating composition which comprises an aqueous dispersion derived from the melt kneading of (A) a base polymer which comprises one or more thermoplastic polymers; (B) from 5 to 40 wt %, based on the total weight of (A) and (B), of a stabilizing agent which comprises at least one component selected from the group consisting of ethic acid copolymers, maleic anhydride grafted polyolefins, and combinations thereof; (C) a neutralizing agent; and (D) water; wherein the aqueous dispersion has a volume average particle size of less than about 5 μm; applying the coating composition to at least one surface of the substrate; removing at least a portion of the water thereby forming a coating layer on the substrate and thereby forming a coated substrate.

In another alternative embodiment, the instant invention further provides a method for forming a sealable film comprising selecting a substrate formed from one or more biaxially oriented polyolefins; selecting a coating composition which consists essentially of an aqueous dispersion derived from the melt kneading of (A) a base polymer which comprises one or more thermoplastic polymers; (B) from 5 to 40 wt %, based on the total weight of (A) and (B), of a stabilizing agent which comprises at least one component selected from the group consisting of ethic acid copolymers, maleic anhydride grafted polyolefins, and combinations thereof; (C) a neutralizing agent; and (D) water; wherein the aqueous dispersion has a volume average particle size of less than about 5 μm; applying the coating composition to at least one surface of the substrate; removing at least a portion of the water thereby forming a coating layer on the substrate and thereby forming a coated substrate.

In another alternative embodiment, the instant invention further provides a method for forming a sealable film comprising selecting a substrate formed from one or more biaxially oriented polyolefins; selecting a coating composition which comprises an aqueous dispersion derived from the melt kneading of (A) a base polymer which consists essentially of one or more thermoplastic polymers; (B) from 5 to 40 wt %, based on the total weight of (A) and (B), of a stabilizing agent which consists essentially of at least one component selected from the group consisting of ethic acid copolymers, maleic anhydride grafted polyolefins, and combinations thereof; (C) a neutralizing agent; and (D) water; wherein the aqueous dispersion has a volume average particle size of less than about 5 μm; applying the coating composition to at least one surface of the substrate; removing at least a portion of the water thereby forming a coating layer on the substrate and thereby forming a coated substrate.

Component A: Base Polymer

The coating composition comprises an aqueous dispersion which comprises the melt kneading product of a base polymer which comprises from 60 to 95 weight percent (wt %), based on the total weight of the base polymer and stabilizing agent ((A) plus (B)), of one or more thermoplastic polymers. All individual values and subranges from 60 to 95 wt % are included herein and disclosed herein; for example, weight percent of the one or more thermoplastic polymers can be from a lower limit of 60, 65, 70, 75, 80, 85 or 90 weight percent to an upper limit of 63, 68, 73, 78, 82, 87, 92 or 95 weight percent. For example, the aqueous dispersion may comprise the melt kneading product of from 60 to 95 wt % one or more thermoplastic polymers, or in the alternative, the aqueous dispersion may comprise the melt kneading product of from 60 to 80 wt % one or more thermoplastic polymers, or in the alternative, the aqueous dispersion may comprise the melt kneading product of from 80 to 95 wt % one or more thermoplastic polymers, or in the alternative, the aqueous dispersion may comprise the melt kneading product of from 80 to 90 wt % one or more thermoplastic polymers, or in the alternative, the aqueous dispersion may comprise the melt kneading product of from 60 to 70 wt % one or more thermoplastic polymers, or in the alternative, the aqueous dispersion may comprise the melt kneading product of from 70 to 80 wt % one or more thermoplastic polymers.

The one or more thermoplastic polymers may comprise one or more olefin based polymers, one or more acrylic based polymers, one or more polyester based polymers, one or more thermoplastic polyurethane polymers, or combinations thereof.

Examples of thermoplastic materials include, but are not limited to, homopolymers and copolymers (including elastomers) of one or more α-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an α-olefin with a conjugated or non-conjugated diene, as typically represented by ethylene-butadiene copolymer and ethylene-ethylidene norbornene copolymer; and polyolefins (including elastomers) such as copolymers of two or more α-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; ethylene-carbon monoxide copolymers (ECO), styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

Exemplary (meth)acrylates, as thermoplastic polymers, include, but are not limited to, methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable (meth)acrylates that can be polymerized from monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In selected embodiments, thermoplastic polymer may, for example, comprise one or more polyolefins selected from the group consisting of ethylene-α olefin copolymers, propylene-α olefin copolymers, and olefin block copolymers. In particular, in select embodiments, the thermoplastic polymer may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers, as described in U.S. Pat. No. 3,645,992; high density polyethylene (HDPE), as described in U.S. Pat. No. 4,076,698; heterogeneously branched linear low density polyethylene (LLDPE); heterogeneously branched ultra-low linear density polyethylene (ULDPE); homogeneously branched, linear ethylene/α-olefin copolymers; homogeneously branched, substantially linear ethylene/α-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

In other particular embodiments, the thermoplastic polymer may, for example, be ethylene vinyl acetate (EVA) based polymers. In other embodiments, the thermoplastic polymer may, for example, be ethylene-methyl acrylate (EMA) based polymers. In other particular embodiments, the ethylene-α olefin copolymer may, for example, be ethylene-butene, ethylene-hexene, or ethylene-octene copolymers or interpolymers. In other particular embodiments, the propylene-α olefin copolymer may, for example, be a propylene-ethylene or a propylene-ethylene-butene copolymer or interpolymer.

In certain other embodiments, the thermoplastic polymer may, for example, be a semi-crystalline polymer and may have a melting point of less than 110° C. In another embodiment, the melting point may be from 25 to 100° C. In another embodiment, the melting point may be between 40 and 85° C.

In one particular embodiment, the thermoplastic polymer is a propylene/α-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}C$ NMR spectra.

The propylene/α-olefin copolymer may have a melt flow rate in the range of from 0.1 to 25 g/10 minutes, measured in accordance with ASTM D-1238 (at 230° C./2.16 Kg). All individual values and subranges from 0.1 to 25 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 25 g/10 minutes, 20 g/10 minutes, 18 g/10 minutes, 15 g/10 minutes, 10 g/10 minutes, 8 g/10 minutes, or 5 g/10 minutes. For example, the propylene/α-olefin copolymer may have a melt flow rate in the range of from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

The propylene/α-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/α-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/α-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/α-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/α-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via Differential scanning calorimetry (DSC) method. The propylene/α-olefin copolymer comprises units derived from propylene and polymeric units derived from one or more α-olefin comonomers. Exemplary comonomers utilized to manufacture the propylene/α-olefin copolymer are $C_2$, and $C_4$ to $C_{10}$ α-olefins; for example, $C_2$, $C_4$, $C_6$ and $C_8$ α-olefins.

The propylene/α-olefin copolymer comprises from 1 to 40 percent by weight of units derived from one or more α-olefin comonomers. All individual values and subranges from 1 to 40 weight percent are included herein and disclosed herein; for example, the weight percent of units derived from one or more α-olefin comonomers can be from a lower limit of 1, 3, 4, 5, 7, or 9 weight percent to an upper limit of 40, 35, 30, 27, 20, 15, 12, or 9 weight percent. For example, the propylene/α-olefin copolymer comprises from 1 to 35 percent by weight of units derived from one or more α-olefin comonomers; or in the alternative, the propylene/α-olefin copolymer comprises from 1 to 30 percent by weight of units derived from one or more α-olefin comonomers; or in the alternative, the propylene/α-olefin copolymer comprises from 3 to 27 percent by weight of units derived from one or more α-olefin comonomers; or in the alternative, the propylene/α-olefin copolymer comprises from 3 to 20 percent by weight of units derived from one or more α-olefin comonomers; or in the alternative, the propylene/α-olefin copolymer comprises from 3 to 15 percent by weight of units derived from one or more α-olefin comonomers.

The propylene/α-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/α-olefin copolymers are further described in details in the U.S. Pat. Nos. 6,960,635 and 6,525,157, incorporated herein by reference. Such propylene/α-olefin copolymers are commercially available from The Dow Chemical Company, under the tradename VERSIFY™, or from ExxonMobil Chemical Company, under the tradename VISTAMAXX™.

In one embodiment, the propylene/α-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches typically it does not exceed 3 long chain branches/1000 total carbons. Such propylene/α-olefin copolymers are further described in details in the U.S. Provisional Patent Application No. 60/988,999 and International Paten Application No. PCT/US08/082,599, each of which is incorporated herein by reference.

In certain other embodiments, the thermoplastic polymer, e.g. propylene/α-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers, may be used as the thermoplastic polymer. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, $\Delta H$ in J/g, and a delta quantity, $\Delta T$, in degrees Celsius defined as the temperature difference between the tallest DSC peak and the tallest CRYSTAF peak, wherein the numerical values of $\Delta T$ and $\Delta H$ having the following relationships:

$$\Delta T > -0.1299(\Delta H) + 62.81 \text{ for } \Delta H \text{ greater than zero and up to 130 J/g,}$$

$$\Delta T > 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the thermoplastic polymer may, for example, comprise a polar polymer, having a polar group as either a comonomer or grafted monomer. In exemplary embodiments, the thermoplastic polymer may, for example, comprise one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary thermoplastic polymers include, but are not limited to, ethylene ethyl acrylate (EEA) copolymer, ethylene methyl methacrylate (EMMA), and ethylene butyl acrylate (EBA).

In one embodiment, the thermoplastic polymer may, for example, comprise a polar polyolefin selected from the group consisting of ethylene-acrylic acid (EAA) copolymer, ethylene-methacrylic acid copolymer, and combinations thereof, and the stabilizing agent may, for example, comprise a polar polyolefin selected from the group consisting of ethylene-acrylic acid (EAA) copolymer, ethylene-methacrylic acid polymer, and combinations thereof; provided, however, that thermoplastic polymer may, for example, have a lower acid number, measured according to ASTM D-974, than the stabilizing agent.

In certain embodiments, the thermoplastic polymer may, for example, comprise a polyester resin. Polyester resin refers to thermoplastic resins that may include polymers containing at least one ester bond. For example, polyester polyols may be prepared via a conventional esterification process using a molar excess of an aliphatic diol or glycol with relation to an alkanedioic acid. Illustrative of the glycols that can be employed to prepare the polyesters are ethylene glycol, diethylene glycol, propylene glycol, dipropylene glycol, 1,3-propanediol, 1,4-butanediol and other butanediols, 1,5-pentanediol and other pentane diols, hexanediols, decanediols, and dodecanediols. In some embodiments, the aliphatic glycol may contain from 2 to about 8 carbon atoms. Illustrative of the dioic acids that may be used to prepare the polyesters are maleic acid, malonic acid, succinic acid, glutaric acid, adipic acid, 2-methyl-1,6-hexanoic acid, pimelic acid, suberic acid, and dodecanedioic acids. In some embodiments, the alkanedioic acids may contain from 4 to 12 carbon atoms. Illustrative of the polyester polyols are poly(hexanediol adipate), poly(butylene glycol adipate), poly(ethylene glycol adipate), poly(diethylene glycol adipate), poly(hexanediol oxalate), and poly(ethylene glycol sebecate). Other embodiments of the present invention use polyester resins containing aliphatic diols such as UNOXOL (a mixture of cis and trans 1,3- and 1,4-cyclohexanedimethanol) available from The Dow Chemical Company (Midland, Mich.).

In certain embodiments, the thermoplastic polymer comprises a thermoplastic polyurethane polymer. Such thermoplastic polyurethane polymers are generally know, and further described, for example, in the International Publication No. 2008/057878, incorporated herein by reference to the extent that it describes a thermoplastic polyurethane polymer.

In a particular embodiment, the thermoplastic polymer is selected from the group consisting of ethylene-based polymers, propylene-based polymers and combinations thereof. In another embodiment, the thermoplastic polymer is an ethylene-based polymer having a melt index, $I_2$, from 1 to 50 g/10 mins and a density from 0.85 to 0.90 g/cm³. All individual values and subranges from 1 to 50 g/10 mins are included herein and disclosed herein; for example, the $I_2$ of the ethylene-based polymer can be from a lower limit of 1, 10, 20, 30 or 40 g/10 mins to an upper limit of 5, 15, 25, 35, 45 or 50 g/10 mins. For example, the ethylene-based polymer may have an $I_2$ from 1 to 50 g/10 mins, or in the alternative, the ethylene-based polymer may have an $I_2$ from 5 to 30 g/10 mins, or in the alternative, the ethylene-based polymer may have an $I_2$ from 1 to 25 g/10 mins, or in the alternative, the ethylene-based polymer may have an $I_2$ from 15 to 50 g/10 mins. All individual values and subranges from 0.85 to 0.90 g/cm³ are included herein and disclosed herein; for example, the density of the ethylene-based polymer may be from a lower limit of 0.85, 0.86, 0.87, 0.88 or 0.89 g/cm³ to an upper limit of 0.86, 0.87, 0.88, 0.89, or 0.90 g/cm³. For example, the thermoplastic polymer may be an ethylene-based polymer having a density from 0.85 to 0.90 g/cm³, or in the alternative, the thermoplastic polymer may be an ethylene-based polymer having a density from 0.875 to 0.90 g/cm³, or in the alternative, the thermoplastic polymer may be an ethylene-based polymer having a density from 0.85 to 0.875 g/cm³, or in the alternative, the thermoplastic polymer may be an ethylene-based polymer having a density from 0.86 to 0.89 g/cm³.

In an alternative embodiment, the thermoplastic polymer comprises a propylene-based polymer. In a particular embodiment, the thermoplastic polymer comprises a propylene-based polymer having a melt flow rate, MFR from 1 to 150 g/10 mins and a density from 0.85 to 0.90 g/cm³. All individual values and subranges from 1 to 150 g/10 mins are included herein and disclosed herein; for example, the propylene-based polymer may have an MFR from a lower limit of 1, 25, 50, 75, 100, 125 or 145 g/10 mins to an upper limit of 5, 30, 80, 105, 115, 130 or 150 g/10 mins. For example, the MFR of the propylene-based polymer may be from 1 to 150 g/10 mins, or in the alternative, the MFR of the propylene-based polymer may be from 1 to 150 g/10 mins, or in the alternative, the MFR of the propylene-based polymer may be from 1 to 75 g/10 mins, or in the alternative, the MFR of the propylene-based polymer may be from 75 to 150 g/10 mins, or in the alternative, the MFR of the propylene-based polymer may be from 5 to 110 g/10 mins.

In another embodiment, the base polymer consists essentially of one or more ethylene-based polymer having a melt index, $I_2$, from 1 to 50 g/10 mins. and a density from 0.85 to 0.90 g/cm³, In another embodiment, the base polymer consists essentially of one or more propylene-based polymer having a melt flow rate, MFR, from 1 to 150 g/10 mins and a density from 0.85 to 0.90 g/cm³.

In another embodiment, the base polymer consists essentially of one or more ethylene-based polymer having a melt index, $I_2$, from 1 to 50 g/10 mins. and a density from 0.85 to 0.90 g/cm³ and one or more propylene-based polymer having a melt flow rate, MFR, from 1 to 150 g/10 mins and a density from 0.85 to 0.90 g/cm³.

Those having ordinary skill in the art will recognize that the above list is a non-comprehensive listing of exemplary thermoplastic polymers. It will be appreciated that the scope of the present invention is restricted by the claims only.

Component B: Stabilizing Agent

The coating composition comprises an aqueous dispersion which comprises the melt kneading product of a base polymer which comprises from 5 to 40 weight percent (wt %), based on the total weight of the base polymer and stabilizing agent ((A) plus (B)), of a stabilizing agent which comprises at least one component selected from the group consisting of ethylene-acrylic acid (EAA) copolymers, ethylene-methacrylic acid (EMMA) copolymers, maleic anhydride grafted polyolefins, and combinations thereof. All individual values and subranges from 5 to 40 wt % are included herein and disclosed herein; for example, the amount of stabilizing agent may be from a lower limit of 5, 10, 15, 20, 25, 30 or 35 wt % to an upper limit of 8, 13, 18, 23, 28, 33, 38 or 40 wt %. For example, the amount of stabilizing agent can be from 5 to 40 wt %, or in the alternative, the amount of stabilizing agent can be from 5 to 25 wt %, or in the alternative, the amount of stabilizing agent can be from 25 to 40 wt %, or in the alternative, the amount of stabilizing agent can be from 15 to 30 wt %, or in the alternative, the amount of stabilizing agent can be from 10 to 20 wt %, all based on the total weight of the base polymer plus the weight of the stabilizing agent.

The stabilizing agent comprises at least one component selected from the group consisting of ethylene-acrylic acid copolymers, ethylene-methacrylic acid copolymers, maleic anhydride grafted polyolefins, and combinations thereof. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Maleic anhydride grafted polyolefins may also be used. Such polymers are available under the name AMPLIFY™ TY Maleic Anhydride Grafted Polyolefins from The Dow Chemical Company. One suitable maleic anhydride grafted ethylene—propylene copolymer is commercially available from Baker Petrolite under the name BHX 10075.

In those embodiments in which component B comprises an ethylene-acrylic acid copolymer, The ethylene-acrylic acid copolymer comprises from 5 to 40 weight percent units derived from acrylic acid based on the total weight of the ethylene-acrylic acid copolymer. All individual values and subranges from 5 to 40 weight percent are included herein and disclosed herein; for example, the amount of units derived from acrylic acid may be from a lower limit of 5, 10, 15, 20, 25, 30 or 35 weight percent to an upper limit of 10, 15, 20, 25, 30, 35, or 40 weight percent. For example, the amount of units derived from acrylic acid may range from 5 to 40 weight percent, or in the alternative, the amount of units derived from acrylic acid may range from 12 to 20 weight percent, or in the alternative, the amount of units derived from acrylic acid may range from 5 to 20 weight percent, or in the alternative, the amount of units derived from acrylic acid may range from 10 to 20 weight percent, or in the alternative, the amount of units derived from acrylic acid may range from 20 to 40 weight percent.

In those embodiments in which component B comprises an ethylene-methacrylic acid copolymer, The ethylene-methacrylic acid copolymer comprises from 5 to 40 weight percent units derived from methacrylic acid based on the total weight of the ethylene-methacrylic acid copolymer. All individual values and subranges from 5 to 40 weight percent are included herein and disclosed herein; for example, the amount of units derived from methacrylic acid may be from a lower limit of 5, 10, 15, 20, 25, 30 or 35 weight percent to an upper limit of 10, 15, 20, 25, 30, 35, or 40 weight percent. For example, the amount of units derived from methacrylic acid may range from 5 to 40 weight percent, or in the alternative, the amount of units derived from methacrylic acid may range from 12 to 20 weight percent, or in the alternative, the amount of units derived from methacrylic acid may range from 5 to 20 weight percent, or in the alternative, the amount of units derived from methacrylic acid may range from 10 to 20 weight percent, or in the alternative, the amount of units derived from methacrylic acid may range from 20 to 40 weight percent.

In a particular embodiment, the stabilizing agent consists essentially of one or more EAA copolymers, EMAA copolymers or a combination of two or more thereof. In yet another embodiment, the stabilizing agent consists essentially of one or more EAA copolymers. In yet another embodiment, the stabilizing agent consists essentially of one or more EMMA copolymers.

Component C: Neutralizing Agent

The neutralizing agent may be present in an amount to provide from 25 to 200 percent neutralization of Component B on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (DMEA) (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1,2-diaminopropane. In some embodiments, mixtures of amines or mixtures of amines and surfactants may be used. Those having ordinary skill in the art will appreciate that the selection of an appropriate neutralizing agent depends on the specific composition formulated and the specific processing conditions, and that such a choice is within the knowledge of those of ordinary skill in the art.

Optional Stabilizing Agent

The aqueous dispersion may further comprise one or more optional stabilizing agents. The stabilizing agent may preferably be an external stabilizing agent. The dispersion of the instant invention comprises 1 to 50 percent by weight of one or more stabilizing agents, based on the total weight of the solid content of the dispersion. All individual values and subranges from 1 to 45 weight percent are included herein and disclosed herein; for example, the weight percent can be from a lower limit of 1, 3, 5, 10 weight percent to an upper limit of 15, 25, 35, 45, or 50 weight percent. For example, the dispersion may comprise from 1 to 25, or in the alternative from 1 to 35, or in the alternative from 1 to 40, or in the alternative from 1 to 45 percent by weight of one or more stabilizing agents, based on the total weight of the solid content of the dispersion. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the thermoplastic polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the thermoplastic polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

In an alternative embodiment of the coating composition, film or method according to any one of the foregoing embodiments, except that no optional stabilizing agents are included in the aqueous dispersion.

Component D: Water

The aqueous dispersion further comprises water. The dispersion of the instant invention comprises 35 to 80 percent by volume of water, based on the total volume of the dispersion. In particular embodiments, the water content may be in the range of from 35 to 75, or in the alternative from 35 to 70, or in the alternative from 45 to 60 percent by volume, based on the total volume of the dispersion. Water content of the dispersion may preferably be controlled so that the solids content (thermoplastic polymer plus stabilizing agent) is between about 1 percent to about 74 percent by volume. In particular embodiments, the solids range may be between about 10 percent to about 70 percent by volume. In other particular embodiments, the solids range is between about 20 percent to about 65 percent by volume. In certain other embodiments, the solids range is between about 25 percent to about 55 percent by volume.

Additional Components

The dispersion according to the present invention may further comprise optionally one or more binder compositions such as acrylic latex, vinyl acrylic latex, styrene acrylic latex, vinyl acetate ethylene latex, and combinations thereof; optionally one or more fillers; optionally one or more additives; optionally one or more pigments, e.g. titanium dioxide, mica, calcium carbonate, silica, zinc oxide, milled glass, aluminum trihydrate, talc, antimony trioxide, fly ash, and clay; optionally one or more co-solvents, e.g. glycols, glycol ether, 2,2,4-trimethyl-1,3-pentanediol monoisobutyrate, alcohols, mineral spirits, and benzoate esters; optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates.

Forming the Dispersion

The dispersion according to the present invention can be formed by any number of methods recognized by those having skill in the art. In one embodiment, Components A and B, and optionally one or more stabilizing agents are melt-kneaded in an extruder along with water and a neutralizing agent to form a dispersion. In another embodiment, Components A and B are compounded, and then the compound is melt-kneaded in an extruder in the presence of an optional stabilizing agent, water, and one or more neutralizing agents thereby forming a dispersion. In some embodiments, the dispersion is first diluted to contain about 1 to about 3% by weight water and then, subsequently, further diluted to comprise greater than about 25% by weight water.

Any melt-kneading means known in the art may be used. In some embodiments, a kneader, a BANBURY® mixer, single-screw extruder, or a multi-screw extruder, e.g. a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

In summary, one or more thermoplastic polymers, in the form of pellets, powder, or flakes, are fed from the feeder to an inlet of the extruder where the resin is melted or compounded.

In some embodiments, Component B is added to the base polymer comprising one or more thermoplastic polymers through and along with the resin and in other embodiments, Component B is provided separately to the twin screw extruder. The resin melt is then delivered from the mix and convey zone to an emulsification zone of the extruder where the initial amount of water and base from the water and base reservoirs are added through an inlet. In some embodiments, Component B may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone.

In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

End-Use Applications

The coating composition of the present invention may be used, for example, in different coating applications such as architectural coating applications, automotive coating applications, paper coating applications, seed coating applications, conductive coatings and industrial coating applications, adhesives applications, sealant applications, foam applications, toner applications, and controlled released coating applications.

In one embodiment, the coating composition may be used for coating biaxially oriented films.

In another embodiment, the coating composition may be used for coating biaxially oriented polypropylene films and/or biaxially oriented polyethylene films.

In another embodiment, the coating composition may be used for coating biaxially oriented polypropylene films used in food packaging, such as packaging for confectionary products.

The coating composition may be applied to a substrate by use of any known technique, including for example, by hand coating or by use of a coating machine.

A biaxially oriented polypropylene film having a coating layer derived from the application of the aqueous dispersion, according to any of the embodiments described herein, at a rate of from 1 to 2 grams per square meter has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer. All individual values and subranges of a heat seal strength of greater than or equal to 0.6 N/15 mm at a sealing temperature from 60 to 70° C. are included herein and disclosed herein. For example, the heat seal strength at a sealing temperature from 60 to 70° C. may be greater than or equal to 0.6 N/15 mm, or in the alternative, greater than or equal to 0.8 N/15 mm, or in the alternative, greater than or equal to 1 N/15 mm, or in the alternative, greater than or equal to 1.3 N/15 mm, or in the alternative, greater than or equal to 1.6 N/15 mm, or in the alternative, greater than or equal to 2 N/15 mm.

All individual values and subranges of a blocking resistance up to at least 40° C. are included herein and disclosed herein. For example, the blocking resistance may be up to at least 42° C., or in the alternative, the blocking resistance may be up to at least 44° C., or in the alternative, the blocking resistance may be up to at least 46° C.

EXAMPLES

The following examples illustrate the present invention but are not intended to limit the scope of the invention.

Several aqueous dispersions having the compositions shown in Table 1 were prepared. Materials used in preparing the aqueous dispersion included the following:

Material A: Ethylene-octene copolymer, $I_2$=5, density=0.87 g/cm$^3$ (Affinity 8200);

Material B: Ethylene-acrylic acid copolymer with an acrylic acid content of 9.6%, $I_2$=300, (Primacor 5980i);

Material C: Propylene-ethylene copolymer, MFI=8, density=0.876 g/cm$^3$ (Versify 3200);

Material D: Propylene-ethylene copolymer, MFI=25, density=0.866 g/cm$^3$ (Versify 4301);

Material E: Propylene-ethylene copolymer, MFI=109 (peroxide-cracked Versify 4301);

Material F: Ethylene-octene copolymer, I$_2$=30, density=0.87 g/cm$^3$ (Affinity-Engage 8407);

Material G: Propylene-ethylene-copolymer grafted with maleic anhydride, acid number=100 (commercially available from BakerPetrolite under the name BHX 10075);

KOH, commercially available, CAS number 1310-58-3; and

DMEA, dimethyl ethanol amine, commercially available, CAS number 108-01-0.

Aqueous dispersions were prepared according to the methods described in WO2005085331, the disclosure of which is incorporated herein in its entirety.

TABLE 1

| | Base polymer, wt % | Stabilizing Agent/Neutralizing Agent |
|---|---|---|
| Comparative Example 1 | 60% Material A | 40% Material B/KOH |
| Comparative Example 2 | 85% Material A | 15% Material B/KOH |
| Comparative Example 3 | 70% Material C | 30% Material B/KOH |
| Comparative Example 4 | 85% Material D | 15% Material B/KOH |
| Comparative Example 5 | 80% Material E | 10% Material B, 10% Material G/DMEA |
| Inventive Example 1 | 80% Material D | 10% Material B, 10% Material G/DMEA |
| Inventive Example 2 | 85% Material F | 15% Material B/DMEA |

Preparation of Hand Coated Films

The aqueous dispersions of each of Inventive Examples 1-2 and Comparative Examples 1-5 were applied on a corona-treated surface of a BOPP film using a bar-coater, with a bar having 4 micron target coating weight to produce Inventive Film Examples 1-2 and Comparative Film Examples 1-5, respectively. Each film was dried for 4 minutes at 80° C. in a standard ventilated oven. Seal strength, hot tack and optical properties were measured. In particular, seal strength was assessed by sealing at the indicated temperature (both upper and lower jaws) for 1 sec dwell time at a pressure of 3 bar, following ASTM F2029-00 (practice B, web sealability). The results are shown in Table 2.

TABLE 2

| | Seal strength at 120° C., N/15 mm | Optics, qualitative |
|---|---|---|
| Uncoated Base Film, BOPP | 2.50 | Transparent, glossy |
| Comparative film example 1 | 0.22 | Very hazy |
| Comparative film example 2 | 2.03 | Very hazy |
| Comparative film example 3 | 0.60 | Very hazy |
| Comparative film example 4 | 1.89 | Hazy |
| Comparative film example 5 | 3.79 | Slightly hazy |
| Inventive film example 1 | 3.68 | Slightly hazy |
| Inventive film example 2 | 2.58 | Slightly hazy |

A BOPP layer machine coated with inventive example 2 at a coating rate of 1.4 gsm (Inventive film example 3) exhibited a seal strength of 3.12 N/15 mm at 60° C. and of 2.64 N/15 mm at 70° C.

Further performance of comparative film examples 4-5 and inventive film examples 1-2 are given in Table 3.

TABLE 3

| | Seal strength at 60° C., N/15 mm | Seal strength at 120° C., N/15 mm | Haze, % | Clarity, % |
|---|---|---|---|---|
| Uncoated base film, BOPP | 0 | 2.50 | 2.01 | 98.0 |
| Comparative film example 4 | 0 | 1.89 | 8.03 | 95.6 |
| Comparative film example 5 | 0.57 | 3.79 | 4.01 | 94.7 |
| Inventive film example 1 | 0.76 | 3.68 | 6.03 | 97.6 |
| Inventive film example 2 | 0.89 | 2.58 | 3.17 | 91 |

Preparation of Coated Films

Inventive example 2 was applied on a corona-treated surface of a biaxially oriented polypropylene (BOPP) film using a lab-scale laminator from Nordmeccanica S.p.A (Piacenza, Italy) to form Inventive Film Example 4. Experimental conditions, such as e.g. pressure of coating roll, speed of primary web, setup of drying tunnel, were optimized and thickness of the applied coating was in the range of 1 micron. In particular, the pressure of the coating roll was varied between 2.5 and 3.5 bars, web speed was varied from 35 to 50 m/min while oven profile was similar to the one a person skilled in the art would use for coating of water-based systems. Nevertheless, influence of processing conditions on performance was not relevant, i.e. inventive example 2 could be processed with a wide window of processing conditions with similar final performance. In a specific case, the pressure on the coating roll was varied between 2.5 and 3.5 bars and the web speed was varied between 35 and 50 m/min. Table 4 provides the seal strength at several temperatures, hot tack range, haze and clarity of Inventive Film Example 2.

TABLE 4

| | Seal strength at 60° C., N/15 mm | Seal strength at 80° C., N/15 mm | Seal strength at 100° C., N/15 mm | Seal strength at 120° C., N/15 mm | Hot Tack range, ° C. | Haze, % | Clarity, % |
|---|---|---|---|---|---|---|---|
| Uncoated Base film, BOPP | 0 | 0 | 1 | 2.50 | 110-130 | 1.58 | 98 |
| Inventive film example | 3.0 | 2.7 | 2.8 | 3 | 50-160 | 3.30 | 90 |

Test Methods

Test methods include the following:

Density was measured in accordance with ASTM D-1928.

Melt index (I$_2$), for ethylene-based polymers, was measured in accordance with ASTM D-1238 at 190° C. and at 2.16 kg.

Melt flow rate (MFR) was measured in accordance with ASTM D-1238 at 230° C. with a 2.16 kg weight for propylene-based polymers.

Haze % was measured according to ASTM D1003-11

Clarity % was according to ASTM D1003-11.

Coating layer weight and thickness were determined gravimetrically. Coating layer weight was determined based on weight difference between coated and uncoated films. Ten disc-shaped pieces (each measuring 100 cm$^2$) of coated film samples were weighed individually on a high precision scale and the coating thickness was determined by subtracting the weight of the base BOPP substrate. The dry coating density is used for calculating the coating thickness based on the weight difference.

Hot tack range was measured according to ASTM F1921-98.

Heat seal strength was measured according to ASTM F2029-00 (practice B, web sealability).

Heat seal coated material on a given substrate was cut into a 1 inch by 12 inch strip. A sample of the uncoated substrate was also cut into a 1 inch by 12 inch strip. The two strips are placed on a glass plate in such a way that the coating on the coated strip is facing down on the uncoated strip. A metal square block weighing one pound (with exact dimension of 1"square) is put on the strips at a 2.5 to 3" apart at a pressure of 1 pound per inch. The combined strips with the weight were then put in a forced air oven maintained at 120° F. for 24 hours. After 24 hours, the combined strips were pulled out from the oven and carefully pulled apart by hand. The coated strip was visually inspected and rated according to the following scale: Completely blocked=5; Slightly blocked=4; Ticking noise=3; Very slight ticking noise=2; No blocking and the two substrates separate and fall apart=1.

The present invention may be embodied in other forms without departing from the spirit and the essential attributes thereof, and, accordingly, reference should be made to the appended claims, rather than to the foregoing specification, as indicating the scope of the invention.

We claim:

1. A coating composition comprising:
an aqueous dispersion comprising:
the melt-kneading product of
(A) from 60 to 95 wt %, based upon the total weight of (A) and (B), of a base polymer which comprises one or more thermoplastic polymers having density from 0.85 to 0.875 g/cm$^3$ and melt index ($I_2$) from 20 to 35 g/10 mins;
(B) from 5 to 40 wt %, based upon the total weight of (A) and (B), a stabilizing agent which comprises at least one component selected from the group consisting of ethylene-acrylic acid copolymers, ethylene-methacrylic acid copolymer, maleic anhydride grafted polyolefins, and combinations thereof;
(C) a neutralizing agent; and
(D) water;
wherein the aqueous dispersion has a volume average particle size of less than about 5 μm; and
wherein a biaxially oriented polypropylene film having a coating layer derived from the application of the aqueous dispersion at a rate of from 1 to 2 grams per square meter has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer.

2. The coating composition according to claim 1, wherein a biaxially oriented polypropylene film having a coating layer derived from the application of the aqueous dispersion at a rate of from 1 to 2 grams per square meter has a heat seal strength of greater than or equal to 2 N/15mm at a sealing temperature from 60 to 70° C.

3. The coating composition according to claim 1, wherein component (B) is present in an amount from 10 to 20 wt %, based on the total weight of (A) and (B).

4. The coating composition according to claim 1, wherein the one or more thermoplastic polymers of the base polymer is selected from the group consisting of ethylene-based polymers, propylene-based polymers, and combinations thereof.

5. The coating composition according to claim 1, wherein the one or more thermoplastic polymers comprises a propylene-based polymer having a melt flow rate, MFR, from 1 to 150 g/10 mins.

6. The coating composition according to claim 1, wherein the neutralizing agent is dimethylethanolamine.

7. The coating composition according to claim 1, wherein the one or more thermoplastic polymers of the base polymer is selected from the group consisting of ethylene-vinyl copolymers, ethylene-vinyl chloride copolymers, ethylene-acrylic acid copolymers, ethylene-(meth)acrylic acid copolymers, ethylene-(meth)acrylate copolymers; ethylene-carbon monoxide copolymers, and combinations thereof.

8. The coating composition according to claim 1, wherein the base polymer comprises one or more ethylene-vinyl alcohol copolymers.

9. A film comprising:
a first layer which comprises one or more biaxially oriented polyolefins; and
at least one coating layer applied to the first layer and derived from a coating composition which comprises an aqueous dispersion comprising the melt-kneading product of
(A) from 60 to 95 wt %, based upon the total weight of (A) and (B), of a base polymer which comprises one or more thermoplastic polymers having density from 0.85 to 0.875 g/cm$^3$ and melt index ($I_2$) from 20 to 35 g/10 mins;
(B) from 5 to 40 wt %, based on the total weight of (A) and (B), of a stabilizing agent which comprises at least one component selected from the group consisting of ethylene-acrylic acid copolymers, ethylene-methacrylic acid copolymers, maleic anhydride grafted polyolefins, and combinations of two or more thereof;
(C) a neutralizing agent; and
(D) water;
wherein the aqueous dispersion has a volume average particle size of less than about 5 μm; and
wherein a biaxially oriented polypropylene film having a coating layer derived from the application of the coating composition at a rate of from 1 to 2 grams per square meter has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer.

10. The film according to claim 9, wherein the first layer is not primed prior to application of the coating layer onto the first layer.

11. The film according to claim 9, wherein the coating layer exhibits a sealing window from 60° C. to 140° C.

12. The film according to claim 9, wherein the application of the coating composition onto the first layer exhibits no build-up on coating rolls.

13. The film according to according to claim 9, wherein the film is suitable for use in contact with food.

14. The film according to claim 10, wherein the coating layer has a final thickness of from 0.5 to 20 microns.

15. A method for forming a heat sealable coated substrate comprising:
selecting a substrate formed from one or more biaxially oriented polyolefins;
selecting a coating composition which comprises an aqueous dispersion derived from the melt kneading of (A)

from 60 to 95 wt %, based upon the total weight of (A) and (B), of a base polymer which comprises one or more thermoplastic polymers having density from 0.85 to 0.875 g/cm$^3$ and melt index ($I_2$) from 20 to 35 g/10 mins; (B) from 5 to 40 wt %, based on the total weight of (A) and (B), of a stabilizing agent which comprises at least one component selected from the group consisting of ethic acid copolymers, maleic anhydride grafted polyolefins, and combinations thereof; (C) a neutralizing agent; and (D) water;

wherein the aqueous dispersion has a volume average particle size of less than about 5 μm;

applying the coating composition to at least one surface of the substrate;

removing at least a portion of the water thereby forming a coating layer on the substrate and thereby forming a coated substrate.

16. The method according to claim 15, wherein the applying the aqueous dispersion is accomplished by hand coating or machine coating.

17. The method of according to claim 15, wherein the weight of the dry coating layer is equal to or less than 5 g/m$^2$.

18. The method of according to claim 15, wherein the thickness of the coating layer is from 0.5 to 20 microns.

19. The method of according to claim 15, wherein the substrate comprises a biaxially oriented polypropylene and the coating composition is applied onto the substrate at a rate of from 1 to 2 grams per square meter and wherein the coated substrate has two or more of the following properties: (a) a heat seal strength of greater than or equal to 0.6 N/15 mm at a sealing temperature from 60 to 70° C.; (b) blocking resistance up to at least 40° C.; and (c) a broader hot tack than observed for the biaxially oriented polypropylene film in the absence of the coating layer.

* * * * *